Patented Sept. 16, 1952

UNITED STATES PATENT OFFICE 2,610,899

PIPELINE TRANSPORTATION OF SOLUBLE GRANULAR MATERIALS

Walter M. Cross, Jr., Kansas City, Mo., assignor to Kansas City Testing Laboratory, Kansas City, Mo., a corporation of Missouri No Drawing. Application February 13, 1948, Serial No. 8,295

12 Claims. (Cl. 302—66)

This invention relates particularly to the transportation by pipeline of salts recovered in the mining of potash but the principle thereof is applicable to other soluble granular materials.

As mentioned in greater detail in my copending application entitled "Pipeline Transportation of Solid Materials," filed February 13, 1948, Serial No. 8,297, which is a continuation in part of this application, the cost of shipping soluble granular materials, such as potassium chloride (potash), by conventional means of rail, water, and land transportation is often excessively high. In certain regions shipping costs are so great that valuable by-products must be abandoned. For example, in the Carlsbad, New Mexico region, thousands of tons of sodium chloride (common table salt) are abandoned daily. This material is a by-product in the winning of potash from sylvinite deposits.

The broad object of my invention is therefore to provide a method whereby the above-mentioned and similar materials may be efficiently and economically transported by pipeline instead of by conventional means.

Basically, my process contemplates transporting the soluble material simultaneously in both the solid and liquid states. The transporting medium therefore consists of a saturated liquid solution of the material with a substantial quantity of granules of material suspended therein.

In order to more specifically describe my invention it is convenient to refer to a particular embodiment thereof. It should be realized that this is merely illustrative, however, and that my method may be employed for transporting other materials having properties similar to those of the materials described.

Applying my invention specifically to the transportation of potash, it is desirable to first prepare a saturated water-solution thereof at an elevated temperature. 200° F. is satisfactory and at this temperature such a solution would consist of fifty-six parts (by weight) of potassium chloride to one hundred parts water. This salt has the property, common to many materials, of being decreasingly soluble in water as the temperature is reduced. Hence, by suitably cooling the hot saturated solution to the temperatures to be encountered in pipeline travel, it is possible to precipitate solid crystals of potassium chloride which will therefore be mixed with a still saturated solution. If the original solution is cooled to 80° F. a medium or mush will be formed consisting of approximately thirty-seven parts of potassium chloride dissolved in one hundred parts of water and about nineteen parts of KCl crystals. This mush may then be forced through a pipeline and the salts recovered.

Since the saturated solution in which the KCl crystals are mixed has a lower specific gravity than the crystals, they will tend to settle. This is, of course, quite undesirable and an important feature of my invention concerns a control of the rate at which the crystals settle.

In addition to the relative specific gravities of the crystals and salt solution, a factor influencing the rate of settling is the ratio of the surface area of the crystals to their weight. As this ratio is increased so is resistance to settling, hence, the rate of settling is lowered. This ratio is inversely proportional to crystal size. Thus the rate of settling may be controlled to an appreciable degree by varying the crystal size.

In the specific example being considered, crystal size may be conveniently controlled by regulating the rate of cooling of the hot saturated solution. Such regulation affects the rate of recrystallization of the precipitated KCl and, therefore, its crystal size. In general, crystal size is inversely proportional to the rate of cooling. At high rates of cooling the crystals are fine and the ratio of surface area to weight is large. In order to control the rate of cooling the hot saturated solution may be passed through a suitable heat exchanger.

Before proceeding with full scale operations, it is desirable to determine the crystal size, and thus the rate of cooling, required to give the desired rate of settling. This is most conveniently done by means of a simple laboratory experiment, though it may be accomplished by calculation. This experiment consists merely in preparing a saturated solution of KCl and water at the pipeline temperature. Crystals of various size are added to it and their rate of settling observed. This test may also be used to determine the maximum proportion of solid phase salt, which, of course, is controlled by the temperature at which the hot saturated solution is formed.

Many factors, particularly the size of pipe to be used, affect the selection of a rate of settling. I have found that it is desirable to regulate crystal size so that it is less than one foot per minute, though often, particularly in large pipes or when agitation is employed, satisfactory transporting is possible at higher rates.

After the crystal size has been determined from the foregoing tests, the rate of cooling the hot saturated solution of potash to produce this crystal size is regulated and it is possible to feed the medium directly from the heat exchanger into the pipeline for transportation.

In order to increase the permissible rate of settling and thus the particle size and quantity of suspended salt, I have found it advantageous to agitate the medium as it passes through the pipeline. This may be done by rifling the pipes or by incorporating at intervals in the pipe line conventional devices such as are used to scrape and pick up settlings in the cleaning of pipelines.

In order to reduce the corrosive action of the medium being transported, it is desirable to adjust the pH to approximately neutral. A pH of eight has been found to be excellent for brine mixtures. In the example given, this may be accomplished by adding alkaline agents such as calcium hydroxide or sodium hydroxide. Inhibitors such as nicotine, arsenious oxide, quinoline ethiodide, etc., may also be added to decrease corrosive action. If desired, the pipes may be lined with suitable materials such as glass or rubber or wrought iron pipes may be used.

Now that my invention has been particularly applied to the transportation of potash, it will no doubt be apparent that it can be used to transport many other materials, even those having different solubility characteristics. For example, approximately thirty-one parts of sodium chloride are soluble in one hundred parts of water at room temperature and this proportion is substantially unchanged even at temperatures as high as 400° F. In this case, therefore, it may be desirable to vary particle size by mechanical means such as grinding or pulverizing. The desired quantity of crystals is then added to a saturated solution of salt at room temperature and the resulting mixture forced through the pipeline.

An important application of the invention consists in the transportation of more than one material at a time. Obviously, more than one material may be suspended in the saturated solution and, in many cases, it is possible to dissolve more than one material in the liquid medium. For example, as much as thirty-one parts of sodium chloride may be dissolved in either the hot or cold saturated solution of potash previously discussed. If the cold solution is saturated with respect to both sodium chloride and potassium chloride, crystals of each of these materials, as well as non-soluble particles of a third material, may be incorporated into a mush which can be forced through the pipelines. At the pipeline terminus, these materials may be individually recovered by suitable methods of separation such as evaporation, filtration, centrifuging, etc. An advantage to dissolving the second material is that it increases the specific gravity of the liquid carrier and thus increases the amount of solid material which may be transported without settling.

In the particular illustration just mentioned there is another important advantage. Sodium chloride has heretofore been abandoned in the mining of potash because shipping expenses priced it out of the market. It is now possible to transport it at virtually no cost, and therefore, in ultimate effect reduce the price of an essential food item.

As indicated the specific details of this invention may be rather widely modified and its scope should therefor be determined by a consideration of the appended claims.

I claim:

1. The method of transporting a soluble granular material, said material having a solubility which increases with temperature, which comprises preparing a saturated liquid solution of the material at an elevated temperature, cooling the solution to precipitate a predetermined quantity of granules of the material of predetermined size, forcing the mixture thus formed through a pipeline, and recovering the material from the mixture.

2. The method of transporting a soluble granular material, said material having a solubility which increases with temperature, which comprises preparing a saturated liquid solution of the material at an elevated temperature, said temperature being predetermined in accordance with the quantity of material to be precipitated, cooling the solution at a predetermined rate to precipitate granules of predetermined size, the size of said granules being such as to provide a predetermined rate of settling, forcing the mixture thus formed through a pipeline, and recovering the material from the mixture.

3. The method of claim 2 wherein the rate of settling is substantially one foot per minute or less.

4. The method of claim 1 including the step of agitating the mixture within the pipeline.

5. The method of transporting potassium chloride which comprises the steps of preparing a hot saturated water solution of KCl, cooling the solution to precipitate crystals of KCl, controlling the size of crystals precipitated, forcing the mixture through a pipeline, and recovering the dissolved and solid KCl.

6. The method of transporting potassium chloride which comprises the steps of preparing a hot saturated water solution of KCl, cooling the solution at a controlled rate so as to precipitate crystals having a settling rate of substantially one foot per minute or less, forcing the mixture through a pipeline, and recovering the dissolved and solid KCl.

7. The method of simultaneously transporting potassium chloride and sodium chloride which comprises the steps of forming a mixture consisting essentially of suspended particles of potassium chloride in a liquid solution containing both of said materials saturated with respect to at least potassium chloride controlling the temperature in the resultant mixture to produce a mixture in which said particles have a settling rate of not more than one foot per minute, forcing said mixture through a pipeline, and recovering the materials from said liquid.

8. The method of transporting a soluble granular material which comprises making a saturated solution of the material in a liquid and suspending granules of said material in said saturated solution, controlling the temperature in the resultant mixture to produce a mixture having a predetermined rate of settling in the solution, forcing the mixture through a pipeline, and recovering said material from the liquid.

9. The method of claim 8 wherein the rate of settling is substantially one foot per minute or less.

10. The method of transporting a soluble granular material which comprises making a saturated solution of the material in a liquid and suspending granules of said material of predetermined size in said saturated solution, controlling the temperature in the resultant mixture to produce a mixture having a predetermined rate of settling in the solution, forcing the mixture through a pipeline, and recovering said material from the liquid.

11. The method of simultaneously transporting two or more soluble materials which comprises making a solution of the materials which is saturated with respect to at least one of the materials, suspending granules of said one material in said saturated solution, controlling the temperature in the resultant mixture to produce a mixture having a predetermined rate of settling in the solution, forcing the mixture through a pipeline, and recovering said materials from the liquid.

12. The method of simultaneously transporting KCl and NaCl which comprises making a solution of the materials which is saturated at an elevated temperature, cooling the solution to precipitate a predetermined quantity of KCl granules of predetermined size, forcing the mixture through a pipeline, and recovering the materials from the liquid.

WALTER M. CROSS, Jr.

REFERENCES CITED

The following references are of record in the file of this patent:

UNITED STATES PATENTS

| Number | Name | Date |
|---|---|---|
| 596,468 | Bell | Jan. 4, 1898 |
| 1,091,251 | Stauffer | Mar. 24, 1914 |
| 1,329,967 | Greenstreet | Feb. 3, 1920 |
| 1,390,230 | Bates | Sept. 6, 1921 |
| 2,042,428 | Krekeler | May 26, 1936 |

OTHER REFERENCES

Page 170, Chemical Refining of Petroleum; Kalichwsky and Stagner, 2d ed., 1942, published by Reinhold Publishing Co.